3,298,906
Patented Jan. 17, 1967

3,298,906

SUBSTITUTED ACROLEIN ACETALS IN PLANT PROTECTANT AND NEMATOCIDAL METHODS

Richard N. Knowles, Hockessin, Del., assignor to E. I. du Pont de Nemours and Company, Wilmington, Del., a corporation of Delaware No Drawing. Filed Nov. 2, 1964, Ser. No. 408,389
10 Claims. (Cl. 167—22)

This invention relates to the use of chemicals to protect plants from soil pests.

More specifically, it refers to a method for protecting plants from soil pests such as nematodes and fungi by applying to soil a plant-protectant amount of a substituted acrolein acetal.

According to the 1953 Yearbook of the U.S. Dept. of Agriculture the average annual loss in the United States in 1963 from plant diseases was estimated to be about three billion dollars. A projected world-wide figure based on that amount would exceed ten billion dollars. Most of this loss is due directly or indirectly to the action of such soil pests as plant parasitic nematodes and pathogenic soil fungi.

Of the many organisms which cause plant diseases such as viruses, bacteria and fungi, few have a wider range of host plants than nematodes. The root knot nematode, Meloidogyne spp., alone attacks more than 1800 plant species according to C. Westcott at p. 249 of Plant Disease Handbook, 2nd ed. (1960). Information gathered during the past one hundred years indicates that all of the crop and ornamental plants grown in the world, and probably most wild plants, can be attacked by plant parasitic nematodes. The breadth of such an attack is indicated by the following list of plants which are especially subject to nematode attack: (1) field crops, including alfalfa, clover, corn, cotton, cowpeas, peanuts, rice, soybeans, sugar beets, sugar cane, sweet potatoes, tobacco, and vetch; (2) ornamental and drug plants, such as begonia, chrysanthemum, cineraria, clematis, coleus, dahlia, hollyhock, ginseng, goldseal, lilies, narcissus, peony, rose, snapdragon, sweet peas and violet; (3) truck crops, including asparagus, beans, beets, cabbage, cantaloupe, carrots, cauliflower, celery, cucumber, dasheen, eggplant, garden peas, lettuce, mushroom, muskmelon, okra, onion, pepper, potato, radish, rutabaga, salsify, spinach, squash, strawberry, tomato, turnip, and watermelon; (4) woody hosts, such as almond, catalpa, cherry, date palm, European elm, fig, mulberry, peach, pecan, and weeping willow; and (5) cereals and grasses, such as astoria bent, buffalo grass, coffeeweed, emmer, fescue, rye lespedeza, spelt and wheat. The results of the nematode attack in the U.S. is generally considered to be an annual crop loss in excess of several hundred million dollars.

The nematodes are roundworms or eelworms mostly in the range of 1/100 to 1/10 in. long. They injure plants directly by their feeding, causing root loss and general stunting, or indirectly by wounding plant tissue thereby providing entry for other pests and making plants more susceptible to other diseases.

Nematodes are found to concentrate in the top few inches of soil where they are present in fantastic numbers. An upper foot of a low-lying alluvial soil can contain more than three billion nematodes to the acre. More than fifteen billion nematodes were reported in the top 72 centimeters of one acre of sugar beet soil in Utah by G. Steiner, Proc. First Int. Congr. Soil Sci., 1928, 3: 260–366. Such numbers, while so large as to stagger the imagination, are truly indicative of the intensity of nematode infestation as indicated by the summary at p. 322 of Principles of Soil Microbiology by S. A. Waksman, 2nd ed., 1932.

Soil fungi are even more widespread and varied in their attack than are the nematodes. Soil fungi probably attack every form of plant life, both living and dead, in the world.

Among the many soil fungi, few are more prevalent and have a broader spectrum of host plants than the genus Rhizoctonia spp. The specie *Rhizoctonia solani* alone attacks hundred of kinds of plants causing blights and rots in field crops, ornamentals, cereals, grasses and truck crops. Other species of Rhizoctonia spp. such as *zeae, crocorum, bataticola, ramicola,* and *tuliparium* increase the breadth of the Rhizoctonia attack even more.

Rhizoctonia spp. are prevalent in varying degrees of severity throughout every State of the United States as well as in most of the rest of the world. They are capable of persisting in the soil for many years even though no cultivated crops are being grown.

Thus a practical and satisfactory method of protecting plants from the ravages of such soil pests as nematodes and Rhizoctonia spp. is a continued goal of the agricultural industry. A chemical that controls nematodes and fungi economically and with safety would find prompt and widespread use in truck crops, field crops, orchards, and nurseries, so long as it exhibited no adverse side effects on the plant itself.

The greatest single disadvantage of previously available dual-purpose chemicals is that they damage the growing plant. Most of these materials are of the fumigant type such as 1,2-dichloropropane, 1,3-dichloropropane, methyl bromide, chloropicrin (trichloronitromethane), and ethylene bromide (1,2-dibromoethane). Such fumigants are all, to some degree, phytotoxic and must therefore be allowed to diffuse from the soil before a crop is planted. For this reason they are unsuited for use on soil where there are mature or growing plants.

I have discovered that particular substituted acrolein acetal compounds possess outstanding plant protectant activity against nematodes and fungi. Further, these compounds exhibit no apparent phytotoxicity to crop plants, fruit trees and ornamentals when applied to the soil in normal commercial fungicidal and nematocidal dosages. This discovery is surprising in light of the fact that unsubstituted acreolein, already known to the art to have fungicidal properties, cannot be used in direct treatment of plants because of its phytotoxicity.

Unlike other known fungicidal acroleins, and the aforementioned fumigants, the compounds used in this invention are not phytotoxic at plant protectant rates for in-the-row or broadcast soil treatments. Additionally, the compounds which I use in this invention, though applied at low rates, will protect crop plants from fungi and nematodes throughout the growing season. These compounds have no residual effect which will adversely influence the ecology of the surrounding area.

The plant protectant compounds used in my invention are voltatile liquids structurally defined as follows:

(1)

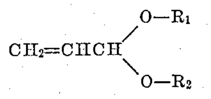

wherein $R_1$ is an alkyl group of less than 5 carbon atoms, an alkenyl group of 3 or 4 carbon atoms, or an alkynyl group of 3 or 4 carbon atoms; and $R_2$ is an alkyl group of less than 5 carbon atoms, an alkenyl group of 3 or 4 carbon atoms, or an alkynyl group of 3 or 4 carbon atoms.

These compounds can be prepared by methods well known in the art, such as by reacting an appropriate alcohol with acrolein in the presence of an acid catalyst and thereafter separating the reaction product. Procedures for the preparation of these compounds can be found, for example, in J. Org. Chem. 25, 521 (1960); J. Am. Chem. Soc., 75, 5893 (1953); or J. Am. Chem. Soc., 71, 2136, 2741 (1949).

A preferred group of compounds because of outstanding activity at low rates are those in which $R_1$ and $R_2$ are the same and are methyl or ethyl.

Compounds of this invention are particularly effective in protecting plants from nematodes such as the root knot nematode Meloidogyne spp., as well as fungi such as that belonging to the genus Rhizoctonia, as is more fully illustrated hereinafter in the examples.

COMPOSITIONS

Plant protectant compositions of this invention can comprise one or more compounds of Formula 1 and one or more surface-active agents.

The surface-active agents or surfactants can include any of the anionic, cationic and non-ionic surface-active agents. Suitable surface-active agents are set out, for example, in "Detergents and Emulsifiers Annual" (1964) by John W. McCutcheon, Inc.

Among the more preferred surfactants are those anionic and non-ionic agents recognized in the art as wetting agents, dispersants or emulsifiers. Among the anionic surfactants, preferred ones are alkali metal or amine salts of alkylbenzene sulfonic acids such as dodecylbenzene sulfonic acid, fatty alcohol sulfates such as sodium lauryl sulfate, alkylnaphthalene sulfonates, sodium-N-methyl-N-oleoyltaurate, fatty acid esters of sodium isethionate, dioctyl sodium sulfosuccinate, alkali and alkaline earth salts of lignin sulfonates and sodium dodecyldiphenyloxide disulfonate. Among the non-ionic compounds, the preferred members are alkyphenoxy poly(ethyleneoxy)-ethanols such as nonylphenol adducts with ethylene oxide; trimethylnonylpolyethylene glycol ethers, polyethylene oxide adducts to fatty and rosin acids, long chain alkyl or mercaptan adducts with ethylene oxide, ethylene oxide adducts to esters of sorbitol with fatty acids, and ethylene oxide-propylene oxide condensates.

Most preferred anionic surfactants, because they improve the ease of dissemination of the active ingredient, are salts of alkylnaphthalene or alkylbenzene sulfonic acid, and alkali or alkaline earth metal salts of lignin sulfonates.

Most preferred non-ionic surfactants, because they improve the ease of dissemination of the active ingredient, are ethylene oxide adducts to alkylphenol, long chain alkyl alcohols containing eight through fourteen carbon atoms, long chain alkyl mercaptans containing eight through fourteen carbon atoms or sorbitan fatty acid esters.

Surfactants can be present in compositions in this invention in the range of 0.1 to 20% by weight. However, a range of 0.2 to 10% by weight is preferred.

Low strength compositions containing 1 to 5% by weight of a compound of Formula 1 can contain common liquid solvents with or without surfactant present. Such solvents as alcohols, ketones, chlorinated hydrocarbons, Cellosolves, aliphatic and aromatic hydrocarbons and N,N-dialkyl amides are satisfatcory.

Suitable liquid solvents include xylene, alkylated naphthalene, cyclohexane, cyclohexanone, chloroethanes, isophorone, dimethylformamide, dimethylacetamide, and dimethylsulfoxide.

Preferably solvents having low phytotoxicity should be used. Among these are white oils, isoparaffins and other hydrocarbons having a low sulfonatable residue.

Low strength compositions containing one or more of the above-mentioned solvents can be used for direct application to the soil.

Additionally, a compound of Formula 1 can be formulated into more concentrated emulsifiable solutions containing 10 to 50% by weight of active ingredient plus solvent and emulsifiers to make up 100%. The solvents can be water insoluble. Typical of the solvents used are higher ketones, higher aliphatic and aromatic hydrocarbons, chlorinated hydrocarbons and the like.

Preferred in the more concentrated solutions are solvents of low phytotoxicity such as the lower viscosity white mineral oils and the isoparaffins such as the "Soltrols."

Additional compositions can be formulated by adding a free-flowing inert powder to the active agent to form a dust.

Free-flowing inert powders can be any of the extenders commonly employed in the fungicide and nematocide art. They can include inert finely divided diluents such as natural clays including attapulgite or kaolinite, diatomaceous earth, pyrophyllite, talc, synthetic mineral fillers derived from silica and silicates such as synthetic fine silica and synthetic calcium or magnesium silicate, carbonates, phosphates, and sulfates, sulfur, lime, and flours such as wood, walnut shell, redwood, soybeans and cottonseed.

Dust compositions can contain 1 to 30% by weight of the active ingredient. However, 3 to 15% by weight is preferred.

Particle size of the extender can vary considerably but will ordinarily be somewhat under 50 microns in the finished formulation. Ureas and other fertilizers can be added to dust formulations to bring the concentration of active ingredient present down to 0.5 to 5% by weight of the total formulation.

In powdered compositions the active compound can be combined with the powder to form granules having a particle size of 8 to 60 mesh. Granules employing these compounds can be prepared by spraying the active compound as a solution over the surface of preformed clay granules or expanded vermiculite. Alternatively, the active compounds or solutions thereof can be mixed with finely divided clays and the mixture then granulated. Preferred granules will contain 0.1 to 10% by weight of an ethylene oxide adduct to alkyl phenols. In these compositions, the active compound ordinarily will be present at the rate of 1 to 25% by weight. However, 3 to 15% by weight is preferred.

In wettable powder compositions containing the active ingredient, one or more surfactants and an absorbent solid diluent, the active compound ordinarily will be present in a concentration in the range of 10 to 35% by weight. It is preferred to have 15 to 25% by weight of active compound. Surfactants will be present in a range from 0.1 to 10% by weight to obtain adequate wetting and dispersion in water. Preferred surfactants are salts of alkylbenzene or naphthalene sulfonic acids and salts of lignin sulfonic acids. The remainder of the composition contains a solid absorbent diluent as described above. Preferred diluents are diatomaceous earth, attapulgite or synthetic fine silica.

Wettable powders are prepared by mixing the ingredients in a blender and grinding the mixture in a hammer mill, air impact mill or the like until the particle size has been reduced to make spray application practical and easy. These wettable powders can also be blended with additional diluents, such as talcs, to form the above-mentioned dust mixtures for direct dry application.

Compositions of this invention can contain soil insecticides such as chlordane, DDT, dieldrin, endrin, aldrin, methoxychlor, and others for simultaneous control of insects, nematodes, and fungi in the soil. From 0.1 to 10 parts by weight of the insecticide is used for each one part by weight of a compound of Formula 1.

Compositions of this invention can also contain other fungicides for control of a broader spectrum of fungi. Illustrative of some of the other compounds which can be used are:

p-dimethylaminobenzenediazo sodium sulfonate;
quinone oxyaminobenzooxohydrazone;

tetraalkyl thiuramsulfides such as tetramethyl thiuram monosulfide or disulfide and tetraethyl thiuram monosulfide or disulfide;
metal salts of ethylene bisdithiocarbamic acid, e.g. manganese, zinc, iron and sodium salts;
pentachloronitrobenzene;
dodecylguanidine acetate;
N-trichloromethylthio-tetrahydrophthalimide (captan);
phenylmercury acetate;
2,4-dichloro-6-(o-chloroanilino)-s-triazine;
N-methylmercury p-toluenesulfonanilide;
chlorophenol mercuri hydroxides;
introphenol mercuri hydroxides;
ethyl mercury acetate;
ethyl mercury 2,3-dihydroxypropyl mercaptide;
methyl mercury acetate;
methyl mercury 2,3-dihydroxypropyl mercaptide;
1,4-dichloro-2,5-dimethoxybenzene;
3,3′-ethylenebis(tetrahydro-4,6-dimethyl-2H-1,3,5-thiadiazine-2-thione);
methyl mercury dicyanodiamide;
N-ethyl mercury-p-toluenesulfonanilide;
metal (e.g. iron, sodium and zinc), ammonium and amine salts of dialkyldithiocarbamic acids;
tetrachloronitroanisole;
hexachlorobenzene;
methyl mercury nitrile;
tetrachloroquinone; and
N-trichloromethylthiophthalimide.

These additional fungicides when used, will be present in the range of one-tenth to ten parts by weight for each one part by weight of a compound of Formula 1.

Wettable powder formulations containing an insecticide, a compound of Formula 1, and other fungicides if desired, are prepared by blending with a diluent and a surfactant, and then grinding in a hamer mill or air impact mill to obtain intimately blended finely divided particles. This type formulation can be dispersed in water, and sprayed in broadcast treatments followed by rotovation into the soil or sprayed in the furrow.

Dust compositions containing an insecticide, a compound of Formula 1, and other fungicides if desired, can be prepared by blending with a diluent and grinding in a hammer mill. These dust compositions can be applied to the soil in conventional dusting equipment in broadcast treatments, in-the-row treatments or as a hopper-box treatment as part of a seeding operation.

Insecticides and fungicides can also be combined with compounds of Formula 1 in emulsifiable compositions by dissolving the additives and a componud of Formula 1 in an inert solvent containing an emulsifier. These compositions are emulsified in water and applied to the soil much like the wettable powders above.

In addition, compositions can contain special additives such as corrosion inhibitors, pigments, antifoam agents and the like.

APPLICATION

Compounds used in this invention can be sprayed or injected on or into the soil. Soil applications are apiled at or before planting, as a side dressing to living plants, in the furrow, as a hopper-box treatment or as a soil drench. The dosage is from 20 pounds to 200 pounds of active ingredient per acre treated depending on method of application and soil type.

Good results are obtained by an in-the-row treatment. Treatment is directed on a band approximately two to four inches wide over an open furrow in such a way as to strike the sides of the furrow as well as the bottom with the seed already in place. The furrow is then closed. The seeds, seedlings, and young growing plants are protected from attack by nematodes and soil fungi. One to ten pounds of active ingredient per 12,000 feet of a two inch wide row gives satisfactory seed and plant protection.

A preferred dosage in-the-row, because of exceptionally good control of soil pests at low cost, is three to seven pounds of active ingredient per 12,000 feet of a two inch wide row. If the band width treated is more or less than two inches the dosage rate is adjusted accordingly. In-the-row treatment is extremely useful in protecting seeds, newly-germinated seedlings and young growing plants from attack by nematodes and fungi.

Due to their volatility, these chemicals may be successfully applied by soil-injection equipment of the type normally used for such purposes. With such equipment the active compound is injected 3 to 8 inches beneath the surface of the soil either as a continuous sheet or as streams spaced 6 to 10 inches apart. The crop is then seeded or planted above the chemical. The board range of the use rates is 20 to 200 pounds of active ingredient per acre with a rate of 50 to 150 pounds per acre usually more preferred.

Under some circumstances the compounds of this invention can be most efficiently applied by distributing evenly on the surface of the soil either by spraying emulsifiable or wettable powder formulations or by spreading granules. The applied chemical is then promptly and thoroughly mixed with the soil by means of a cultural tool such as a disc or rotovator. Use rates are in the range of 20 to 200 pounds of active compound per acre of surface actually treated. More preferred rates are in the range of 50 to 150 pounds per acre.

Soil drench treatments protect seeds, seedlings, and plants from the ravages of soil pests by application of the compounds used in this invention at rates of about 20 to 200 pounds of active ingredient per acre of area treated.

Compounds used in this invention can also be used for seed treatments. For example, the material can be applied as a slurry to the surface of seeds or can be mixed with seeds such as cotton seeds in the hopper-box treatment at planting time at rates of ten to one hundred ounces of active ingredient per cwt. of seeds to give protection from nematodes and soil fungi. A preferred rate because of excellent control and low cost is twenty to sixty ounces of active ingredient per cwt. of seeds.

In order that this invention can be better understood, the following additional examples are provided. It should be understood that all percentages given are by weight unless otherwise specified.

*Example 1*

| | Percent |
|---|---|
| Acrolein dimethyl acetal | 90 |
| Blend of alkylarylpolyether alcohols with organic sulfonates | 10 |

The above composition forms a homogeneous solution with simple mixing. It will dilute readily with water by spontaneous emulsification.

*Example 2*

| | Percent |
|---|---|
| Acrolein diethyl acetal | 10 |
| Ethylene oxide adduct to alkylphenol | 2 |
| 8–60 mesh granular attapulgite | 88 |

The active material and surfactant are first mixed together, and the solution is then sprayed upon the granular attapulgite while tumbling in a drum.

*Example 3*

| | Percent |
|---|---|
| Acrolein diethyl acetal | 30.0 |
| Alkylnaphthalene sulfonate partially desulfonated sodium | 1.5 |
| Lignin sulfonate | 0.5 |
| Synthetic fine silica | 68.0 |

A dry mixture of the two surfacctants and fine silica are sprayed in a ribbon blender with the liquid acetal. After blending until the liquid is fully absorbed, the product is micropulverized until free agglomerates greater than 50 microns.

*Example 4*

| | Percent |
|---|---|
| Acrolein dimethyl acetal | 50 |
| Ethylene oxide adduct to sorbitan fatty ester | 7 |
| Isoparaffin (Soltrol 130) | 43 |

A homogeneous solution results from mixing of these three components. It may be emulsified in water or applied directly.

*Example 5*

The formulation of Example 1 is diluted with water to form an emulsion containing six pounds of the active ingredient per ten gallons of emulsion. This is applied with a sprayer attached to a cotton planter. The spray is directed in such a way that it covers the sides and bottom of the furrow just after the seed is dropped. The rate of application is ten gallons of emulsion per 12,000 feet of row. The furrow is then closed leaving the seed in contact with treated soil and with treated soil above. The cotton so treated germinates and emerges to a good stand of healthy and rapidly-growing seedlings. Adjoining rows planted at the same time and in the same way but left untreated have only a sparse stand due to pre- and post-emergence damping-off caused by fungi of the genera Rhizoctonia and Pythium. Also, growth is reduced in the remaining plants in the untreated rows due to attack by nematodes such as the root-knot nematode, of the genus Meloidogyne.

*Example 6*

The granular formulation of Example 2 is spread broadcast with a fertilizer spreader at the rate of 1,000 pounds of commodity per acre and immediately worked into the soil with a rotovator set at a depth of 6 inches. The treated area is then seeded in the usual manner for cucumbers. The crop plants emerge uniformly to produce an excellent stand. The plants remain thrifty throughout the life of the crop and the yield is good. In a similar area handled in the same manner except that the application of the granules containing the acrolein diethyl acetal was omitted, the stand was poor due to seed destruction and seedling kill by organisms of the genera Rhizoctonia and Pythium. Subsequent growth of the surviving plants on the untreated area was poor and the yield was low due to root rot caused by fungi of the genera Pythium and Fusarium and due to root damage caused by the root-knot nematode.

*Example 7*

The formulation of Example 3 is diluted with finely divided talc to provide a free-flowing dust containing 15 percent of the active ingredient. This is added to the hopper-box of a cotton planter in alternating layers with the seed at a rate of ten pounds of the 15 percent dust per 100 pounds of seed. As the planter is operated in the field the dust falls out with the seed into the furrow. Rows treated in this manner produce a full stand of thrifty cotton plants. Other rows handled in the same manner except for the addition of the dust produce an irregular stand of poor vigor due to attack by fungi of the genera Rhizoctonia and Pythium and by root-knot nematodes, meadow nematodes of the genus Pratylenchus and sting nematodes of the genus Belonolaimus.

*Example 8*

The formulation of Example 4 is injected into the soil with equipment of the type normally used in tobacco fields. Two shanks per row are used. These are spaced about eight inches apart with one on either side of the proposed row center. During operation they are set in such a way as to deliver the liquid formulation to a point about six inches below the surface of the soil. The rate of delivery is controlled in such a way that about 45 pounds of active ingredient is used per 12,000 linear feet of row treated. Tobacco plants are then set in the rows in the usual manner. Plants set in rows treated in this manner survive and grow well producing a maximum yield. Many of the plants set in untreated soil in the same field are killed by fungi of the genera Rhizoctonia and Pythium. Those plants that do survive grow poorly and yield little due to attack by root-knot nematodes, meadow nematodes, and stunt nematodes of the genus Tylenchorhynchus.

*Example 9*

A young peach orchard is growing poorly and is generally unthrifty in appearance due to the presence in the soil of a high population of root-knot and dagger nematodes. The formulation of Example 4 is diluted with water to give an emulsion containing five pounds of the active ingredient per 100 gallons of emulsion. This emulsion is sprayed over an area of 100 square feet (10 x 10) about the base of each tree at the rate of ten gallons per tree. The area is then promptly irrigated to the equivalent of three inches of rainfall. During subsequent growing seasons the treated trees grow much more rapidly, become obviously more thrifty and produce a higher yield of fruit. The untreated trees in the same orchard, however, fail to improve.

*Example 10*

The application of Example 5 is repeated with a formulation like that of Example 1 in which a like amount of acrolein diethyl acetal has been substituted for the acrolein dimethyl acetal of Example 1. Similar outstanding results to those of Example 5 are obtained.

*Example 11*

The application of Example 6 is repeated with a granular formulation of 10% acrolein dimethyl acetal which is prepared as in Example 2. Plant growth and yield similar to that of Example 6 is obtained.

*Example 12*

The application of Example 7 is repeated with a dust containing 15% acrolein dimethyl acetal. The dust is prepared as in Example 3 followed by dilution with talc as in Example 7. A good stand of cotton which gives a high yield is obtained.

*Example 13*

The application of Example 8 is repeated with a formulation of Example 4 in which a like amount of acrolein diethyl acetal has been used instead of the acrolein dimethyl acetal of Example 4. The results are similar to those of Example 8, with good tobacco yields from a good stand.

The invention claimed is:

1. A method for protecting plants from nematodes comprising applying to soil in the locus of the plant a protectant amount of a compound of the formula:

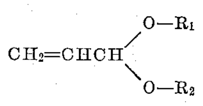

wherein $R_1$ is selected from the group consisting of alkyl of less than 5 carbon atoms, alkenyl of not less than 3 and not more than 4 carbon atoms, and alkynyl of not less than 3 and not more than 4 carbon atoms; and $R_2$ is selected from the group consisting of alkyl of less than 5 carbon atoms, alkenyl of not less than 3 and not more than 4 carbon atoms, and alkynyl of not less than 3 and not more than 4 carbon atoms.

2. A method of claim 1 in which the compound applied is acrolein dimethyl acetal.

3. A method of claim 1 in which the compound applied is acrolein diethyl acetal.

4. A method for protecting seeds from nematodes comprising applying to soil in the locus of the seed to be protected a protectant amount of a compound of the formula:

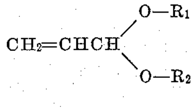

wherein $R_1$ is selected from the group consisting of alkyl of less than 5 carbon atoms, alkenyl of not less than 3 and not more than 4 carbon atoms, and alkynyl of not less than 3 and not more than 4 carbon atoms, and $R_2$ is selected from the group consisting of alkyl of less than 5 carbon atoms, alkenyl of not less than 3 and not more than 4 carbon atoms, and alkynyl of not less than 3 and not more than 4 carbon atoms.

5. A method for protecting plants from nematodes comprising applying to the nematodes a protectant amount of a compound of the formula:

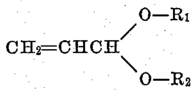

wherein $R_1$ is selected from the group consisting of alkyl of less than 5 carbon atoms, alkenyl of not less than 3 and not more than 4 carbon atoms, and alkynyl of not less than 3 and not more than 4 carbon atoms; and $R_2$ is selected from the group consisting of alkyl of less than 5 carbon atoms, alkenyl of not less than 3 and not more than 4 carbon atoms, and alkynyl of not less than 3 and not more than 4 carbon atoms.

6. A method of claim 5 in which the compound applied is acrolein dimethyl acetal.

7. A method of claim 5 in which the compound applied is acrolein diethyl acetal.

8. A method of controlling nematodes comprising contacting the nematodes with a controlling amount of a compound of the formula:

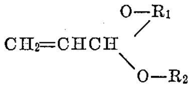

wherein $R_1$ is selected from the group consisting of alkyl of less than 5 carbon atoms, alkenyl of not less than 3 and not more than 4 carbon atoms, and alkynyl of not less than 3 and not more than 4 carbon atoms; and $R_2$ is selected from the group consisting of alkyl of less than 5 carbon atoms, alkenyl of not less than 3 and not more than 4 carbon atoms, and alknyl of not less than 3 and not more than 4 carbon atoms.

9. A method of claim 8 in which the compound employed is acrolein dimethyl acetal.

10. A method of claim 8 in which the compound employed is acrolein diethyl acetal.

References Cited by the Examiner

UNITED STATES PATENTS 2,562,870 7/1951 Owen ---------- 167—39 XR
2,585,493 2/1952 Owen --------------- 167—22
3,028,304 4/1962 Kreutzer --------- 167—22 XR
3,052,594 9/1962 Baker ----------- 167—22 XR

OTHER REFERENCES

Frear. Chemistry of the Pesticides, 3rd ed., D. Van Nostrand, New York (1955), pp. 412–419.

JULIAN S. LEVITT, *Primary Examiner.*

VERA C. CLARKE, *Assistant Examiner.*

UNITED STATES PATENT OFFICE
CERTIFICATE OF CORRECTION

Patent No. 3,298,906 January 17, 1967

Richard N. Knowles

It is hereby certified that error appears in the above numbered patent requiring correction and that the said Letters Patent should read as corrected below.

Column 10, lines 8 to 14, the formula should appear as shown below instead of as in the patent:

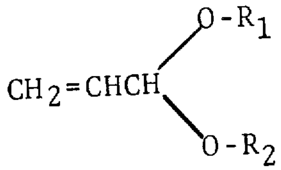

Signed and sealed this 24th day of October 1967.

(SEAL)
Attest:

EDWARD M. FLETCHER, JR.
Attesting Officer

EDWARD J. BRENNER
Commissioner of Patents